(12) United States Patent  
Santiago et al.

(10) Patent No.: US 7,843,078 B2  
(45) Date of Patent: Nov. 30, 2010

(54) METHOD AND APPARATUS FOR GENERATING POWER IN A WIND TURBINE

(75) Inventors: Pedro Luis Benito Santiago, Rheine (DE); Eugenio Yegro Segovia, Madrid (ES); Miguel Bartolome Lopez, Leon (ES)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/570,490

(22) Filed: Sep. 30, 2009

(65) Prior Publication Data

US 2010/0133826 A1 Jun. 3, 2010

(51) Int. Cl.  
*H02P 9/00* (2006.01)
(52) U.S. Cl. ....................................................... 290/44
(58) Field of Classification Search .................. 290/44, 290/55  
See application file for complete search history.

(56) References Cited

U.S. PATENT DOCUMENTS

| | | | | |
|---|---|---|---|---|
| 3,151,261 | A | * | 9/1964 | Lee .............................. 310/198 |
| 4,890,049 | A | * | 12/1989 | Auinger ....................... 318/771 |
| 4,906,060 | A | * | 3/1990 | Claude ......................... 322/29 |
| 6,380,648 | B1 | * | 4/2002 | Hsu .......................... 310/67 A |
| 6,392,371 | B1 | * | 5/2002 | Cheng et al. ................ 318/158 |
| 6,781,276 | B1 | * | 8/2004 | Stiesdal et al. ............ 310/254.1 |
| 6,847,128 | B2 | | 1/2005 | Mikhail et al. |
| 6,856,039 | B2 | | 2/2005 | Mikhail et al. |
| 7,081,725 | B2 | | 7/2006 | Seely et al. |
| 7,095,131 | B2 | | 8/2006 | Mikhail et al. |
| 7,239,036 | B2 | * | 7/2007 | D'Atre et al. ................. 290/44 |
| 7,253,537 | B2 | | 8/2007 | Weng et al. |
| 7,411,309 | B2 | | 8/2008 | Hudson |
| 7,518,256 | B2 | * | 4/2009 | Saragueta et al. ............. 290/44 |
| 7,649,274 | B2 | * | 1/2010 | Burt ............................. 290/43 |
| 2007/0182273 | A1 | * | 8/2007 | Burt ........................... 310/254 |
| 2008/0303489 | A1 | | 12/2008 | Park et al. |
| 2009/0102328 | A1 | * | 4/2009 | Takekawa ................. 310/68 D |
| 2009/0121482 | A1 | * | 5/2009 | Rickard ........................ 290/44 |
| 2010/0052330 | A1 | * | 3/2010 | Rasmusen .................... 290/55 |

FOREIGN PATENT DOCUMENTS

| CN | 201185358 Y | * | 1/2009 |
|---|---|---|---|
| JP | 2007116793 A | * | 5/2007 |

OTHER PUBLICATIONS

CN 201185358 Y, Jan. 2009, Abstract, English translation.*

* cited by examiner

*Primary Examiner*—Joseph Waks  
(74) *Attorney, Agent, or Firm*—James McGinness, Esq.; Armstrong Teasdale LLP

(57) ABSTRACT

A generator for use in a wind turbine includes a rotor including a plurality of windings. The rotor is configured to be electrically coupled to a wind turbine electrical distribution system. The generator also includes a stator including a plurality of windings. The stator is configured to be magnetically coupled to the rotor and electrically coupled to the wind turbine electrical distribution system. The stator is further configured to switch between a first number of magnetic poles and a second number of magnetic poles.

20 Claims, 10 Drawing Sheets

METHOD AND APPARATUS FOR GENERATING POWER IN A WIND TURBINE

BACKGROUND OF THE INVENTION

The present application relates generally to wind turbines and, more particularly, to a method and apparatus for generating power in a wind turbine.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Many known wind turbines use DFIGs to generate power from wind speeds that fluctuate around a rated wind speed of the wind turbines. Such DFIGs typically enable the wind turbine to operate efficiently within a range of approximately 30% above and below a rated wind speed of the wind turbines. To capture energy from a broader range of wind speeds, at least some known wind turbines include two separate generators, each having a different operating speed. However, the use of two separate generators creates additional cost and may increase the cost of generating power.

BRIEF DESCRIPTION OF THE INVENTION

In one embodiment, a generator for use in a wind turbine is provided that includes a rotor having a plurality of rotor windings, and the rotor is configured to be electrically coupled to a wind turbine electrical distribution system. The generator also includes a stator having a plurality of stator windings. The stator is configured to be magnetically coupled to the rotor, and electrically coupled to the wind turbine electrical distribution system. The stator is further configured to switch between a first number of magnetic poles and a second number of magnetic poles.

In another embodiment, a wind turbine is provided. The wind turbine includes a wind turbine electrical distribution system and a generator. The generator includes a rotor having a plurality of rotor windings, and the rotor is configured to be electrically coupled to a wind turbine electrical distribution system. The generator also includes a stator having a plurality of stator windings, and the stator is configured to be magnetically coupled to the rotor. The stator is configured to be electrically coupled to the wind turbine electrical distribution system, and to switch between a first number of magnetic poles and a second number of magnetic poles.

In another embodiment, a method for generating power in a wind turbine is provided. The method includes providing a wind turbine electrical distribution system within the wind turbine, and coupling a generator to the wind turbine electrical distribution system. The generator includes a rotor having a plurality of rotor windings, and a stator having a plurality of stator windings. The method also includes magnetically coupling the stator to the rotor and configuring the stator to switch between a first number of magnetic poles and a second number of magnetic poles.

DETAILED DESCRIPTION OF THE INVENTION

Figure 1:
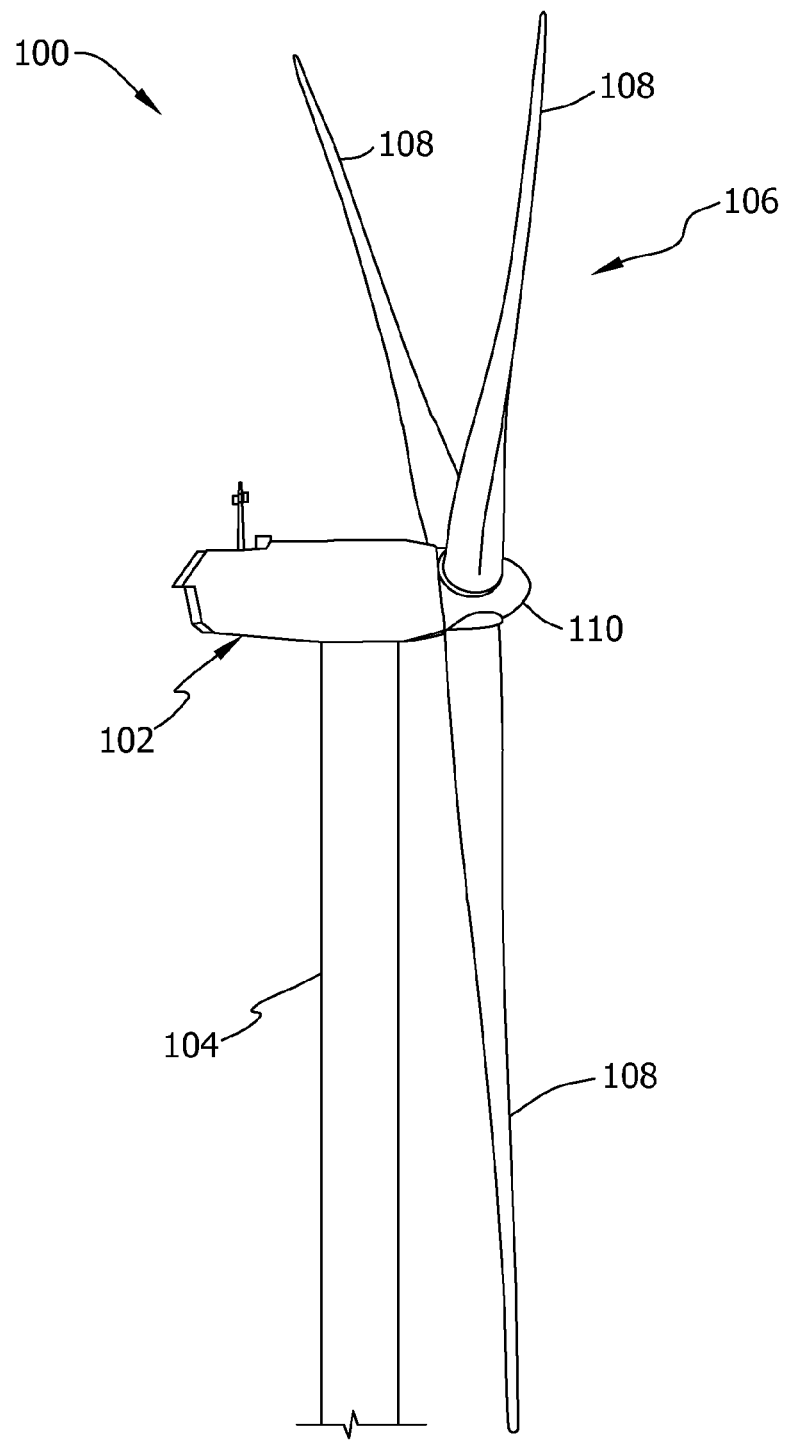
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may be any height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitate operation of wind turbine 100 as described herein. In the exemplary embodiment, wind turbine 100 includes a gearbox (not shown in FIG. 1) rotatably coupled to rotor 106 and a generator (not shown in FIG. 1).

Figure 2:
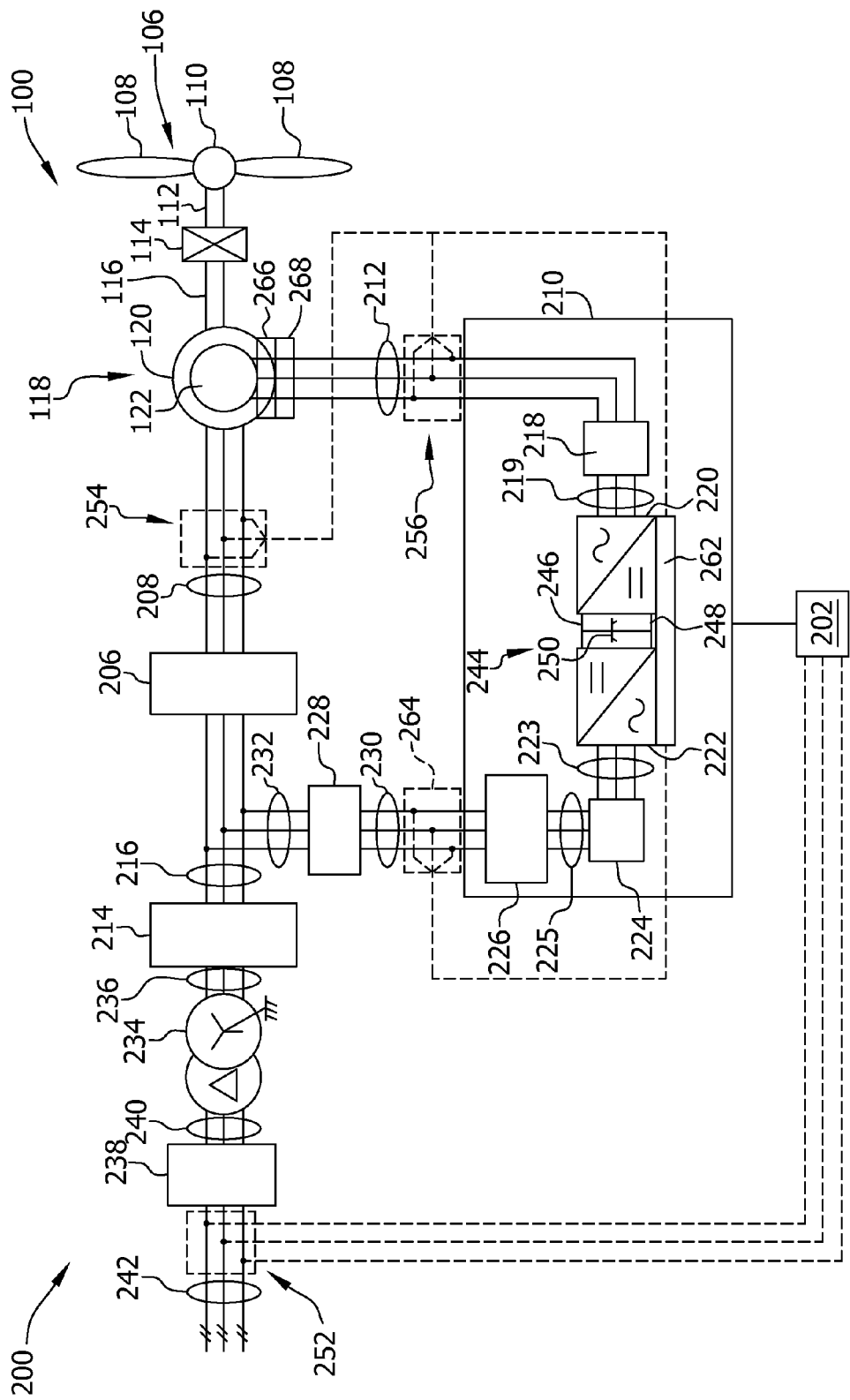
FIG. 2 is a schematic view of an exemplary electrical and control system that may be used with the wind turbine shown in FIG. 1.

FIG. 2 is a schematic view of an exemplary electrical and control system 200 that may be used with wind turbine 100. Rotor 106 includes blades 108 coupled to rotating hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to just those integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2), may also be used. Also, in the exemplary embodiment, additional input channels (not shown in FIG. 2) may be, but are not limited to, computer peripherals associated with an operator interface such as a mouse and a keyboard (neither shown in FIG. 2). Furthermore, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. As shown in FIG. 2, generator rotor 122 is electrically coupled to rotor bus 212 via at least one slip ring 266, and slip ring 266 may be coupled to at least one variable resistor 268 for use in adjusting a slip of generator rotor 122. For example, variable resistor 268 may be electrically or mechanically variable, such that turbine controller 202 and/or a user may adjust a resistance of variable resistor 268 as desired, to adjust the amount of slip of generator 118. Alternatively, generator rotor 122 is electrically coupled to rotor bus 212 via any other device that facilitates operation of electrical and control system 200 as described herein. As a further alternative, electrical and control system 200 is configured as a full power conversion system (not shown) known in the art, wherein a full power conversion assembly (not shown in FIG. 2), that is similar in design and operation to power conversion assembly 210, is electrically coupled to generator stator 120, and such full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 are used, but rather stator synchronizing switch 206 is coupled to a generator-side bus 236 via system bus 216.

Power conversion assembly 210 includes a rotor filter 218 that is electrically coupled to generator rotor 122 via rotor bus 212. Rotor filter 218 is electrically coupled to a rotor-side, bi-directional power converter 220 via a rotor filter bus 219. Rotor-side power converter 220 is electrically coupled to a line-side, bi-directional power converter 222. Rotor-side and line-side power converters 220 and 222 are power converter bridges including power semiconductors (not shown). In the exemplary embodiment, rotor-side and line-side power converters 220 and 222 are configured in a three-phase, pulse width modulation (PWM) configuration including insulated gate bipolar transistor (IGBT) switching devices (not shown in FIG. 2) that operate as known in the art. Alternatively, rotor-side and line-side power converters 220 and 222 have any configuration using any switching devices that facilitate operation of electrical and control system 200 as described herein. Power conversion assembly 210 is coupled in electronic data communication with turbine controller 202 to control the operation of rotor-side and line-side power converters 220 and 222.

In the exemplary embodiment, line-side power converter 222 is electrically coupled to a line filter 224 via a line-side power converter bus 223. Also, line filter 224 is electrically coupled to a line contactor 226 via a line bus 225. Moreover, line contactor 226 is electrically coupled to a conversion circuit breaker 228 via a conversion circuit breaker bus 230. In addition, conversion circuit breaker 228 is electrically coupled to main transformer circuit breaker 214 to one or more fuses, or to generator-side bus 236, via system bus 216 and connection bus 232. Alternatively, line filter 224 is electrically coupled to system bus 216 directly via connection bus 232 wherein any protection scheme (not shown) is configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to an electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 are used, but rather main transformer 234 is coupled to the electric power transmission and distribution grid via breaker-side bus 240 and grid bus 242.

In the exemplary embodiment, rotor-side and line-side power converters 220 and 222 are coupled in electrical communication with each other via a single direct current (DC) link 244. Alternatively, rotor-side and line-side power converters 220 and 222 are electrically coupled via individual and separate DC links (not shown in FIG. 2). DC link 244 includes a positive rail 246, a negative rail 248, and at least one capacitor 250 coupled therebetween. Alternatively, capacitor 250 is one or more capacitors configured in series or in parallel between positive and negative rails 246 and 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of system 200 as described herein. As a still further alternative, turbine controller 202 is configured to receive any number of voltage and electric current measurement signals from any number of voltage and electric current sensors 252, including, but not limited to, one voltage and electric current measurement signal from one transducer.

As shown in FIG. 2, electrical and control system 200 also includes a converter controller 262 that is configured to receive a plurality of voltage and electric current measurement signals from a second set of voltage and electric current sensors 254 (that are coupled in electronic data communication with stator bus 208), a third set of electric current measurement signals from a third set of electric current sensors 256 (that are coupled in electronic data communication with rotor bus 212) and a fourth set of electric current measurement signals from a fourth set of electric current sensors 264 (that are coupled in electronic data communication with conversion circuit breaker bus 230). Second set of sensors 254 is substantially similar to first set of sensors 252, and fourth set of sensors 264 is substantially similar to third set of sensors 256. Converter controller 262 is substantially similar to turbine controller 202 and is coupled in electric data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 wherein the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 wherein converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close such that connecting the three-phase power from generator stator 120 with the three-phase power from power conversion assembly 210 is facilitated.

Circuit breakers 228, 214, and 238 are configured to disconnect corresponding buses, for example, when current flow is excessive and can damage the components of electrical and control system 200. Additional protection components are also provided, including line contactor 226, which may be controlled to form a disconnect by opening a switch (not shown in FIG. 2) corresponding to each of the lines of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side and line-side power converters 220 and 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 wherein converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200, received by turbine controller 202 and used to control operation of power conversion assembly 210. Feedback from sensors may be used by electrical and control system 200 to control power conversion assembly 210 via converter controller 262 including, for example, conversion circuit breaker bus 230, stator bus and rotor bus voltages or current feedbacks via voltage and electric sensors 264, 254, and 256. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Figure 3:
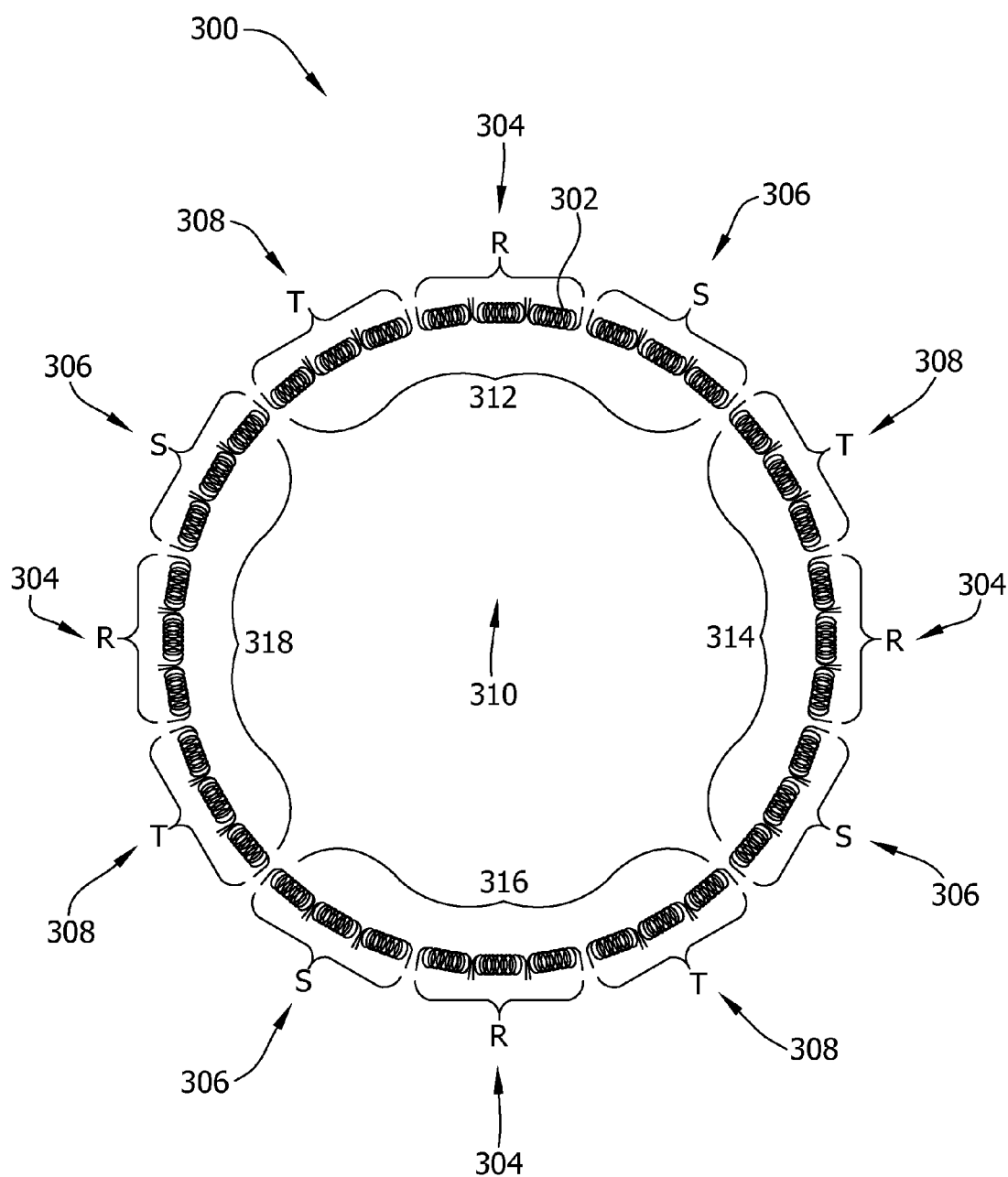
FIG. 3 is a schematic view of an exemplary stator winding assembly that may be used with the electrical and control system shown in FIG. 2.

FIG. 3 is a schematic view of an exemplary stator winding assembly 300 that may be used with electrical and control system 200 (shown in FIG. 2). Although FIG. 3 shows stator winding assembly 300 having 36 stator windings 302 that are arranged in a 4 pole configuration, in the exemplary embodiment, stator winding assembly 300 includes any number of stator windings 302 arranged with any number of poles that enables electrical and control system 200 to operate as described herein. Stator windings 302 are constructed of a conductive material, such as steel, copper, or another material known in the art.

Stator winding assembly 300 is configured to magnetically couple to generator rotor 122 (shown in FIG. 2) and to form a plurality of magnetic poles 310. FIG. 3 shows a configuration of stator winding assembly 300 having 4 poles, including a first pole 312, a second pole 314, a third pole 316, and a fourth pole 318. In the exemplary embodiment, stator windings 302 are configured to be coupled to a three phase electrical bus, such as stator bus 208 (shown in FIG. 2). More specifically, stator windings 302 are configured to be coupled to a first phase 304, a second phase 306, and/or a third phase 308 of stator bus 208.

Figure 4:
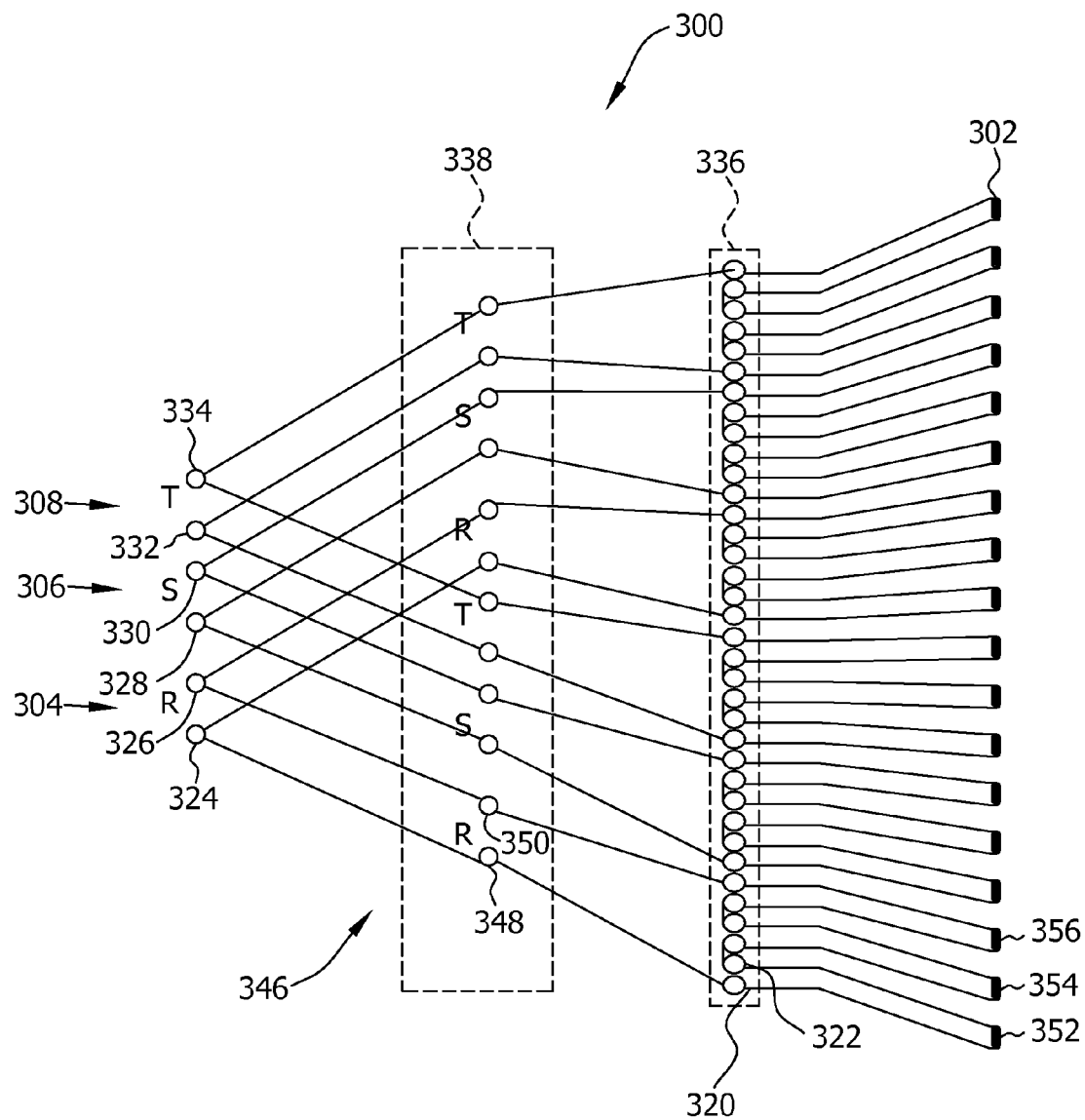
FIG. 4 is a schematic view of a portion of the exemplary stator winding assembly shown in FIG. 3.

FIG. 4 illustrates a schematic view of a portion of stator winding assembly 300 (shown in FIG. 3). Each stator winding 302 includes a winding first terminal 320 and a winding second terminal 322. In the exemplary embodiment, winding first terminal 320 and winding second terminal 322 of each stator winding 302 is configured to be coupled to a stator winding terminal box 336 and/or to a pole switching box 338. In the exemplary embodiment, terminal box 336 is configured to couple winding first terminal 320 and/or winding second terminal 322 together, and/or to winding first terminal 320 and/or winding second terminal 322 of one or more adjacent stator windings 302. Pole switching box 338 includes a plurality of terminals 346 that are configured to be coupled to winding first terminal 320 and/or second terminal 322 of one or more stator windings 302. Pole switching box terminals 346 are configured to be coupled to first phase 304, second phase 306, and/or third phase 308 of stator bus 208 (shown in FIG. 2). First phase 304 includes a first terminal 324 and a second terminal 326, second phase 306 includes a first terminal 328 and a second terminal 330, and third phase 308 includes a first terminal 332 and a second terminal 334.

In the exemplary embodiment, terminal box 336 and/or pole switching box 338 are operatively controlled by turbine controller 202 (shown in FIG. 2). Turbine controller 202 selects a number of magnetic poles 310 (shown in FIG. 3) with which to operate stator winding assembly 300, as described more fully herein. In the exemplary embodiment, terminal box 336 couples one or more adjacent stator windings 302 together via winding first terminal 320 and winding second terminal 322 of each stator winding 302. In one embodiment (shown in FIG. 4), terminal box 336 couples three stator windings 302 together via winding first terminals 320 and winding second terminals 322, as described more fully herein, to facilitate creating a 4 pole stator winding assembly 300. In an alternative embodiment, terminal box 336 couples a different number of adjacent stator windings 302 together via winding first terminals 320 and winding second terminals 322 to facilitate creating a stator winding assembly 300 having 4 poles, or a different number of poles.

In the exemplary embodiment, to form a 4 pole configuration of stator winding assembly 300, pole switching box 338 couples a pole switching box first terminal 348 to a first terminal 320 of a first stator winding 352. Terminal box 336 couples a second terminal 322 of first stator winding 352 to a first terminal 320 of a second stator winding 354. Terminal box 336 couples a second terminal 322 of second stator winding 354 to a first terminal 320 of a third stator winding 356. As such, terminal box 336 couples first stator winding 352 to second stator winding 354, and second stator winding 354 to third stator winding 356. Pole switching box 338 couples a pole switching box second terminal 350 to a second terminal 322 of third stator winding 356. Pole switching box 338 also couples pole switching box first terminal 348 to first phase first terminal 324, and pole switching box second terminal 350 to first phase second terminal 326. As such, in the exemplary embodiment, terminal box 336 and pole switching box 338 couple three stator windings 302 to first phase 304 of stator bus 208. In an alternative embodiment, terminal box 336 and pole switching box 338 couple any number of stator windings 302 to first phase 304 of stator bus 208.

In the exemplary embodiment, terminal box 336 and pole switching box 338 couple three adjacent stator windings 302 to second phase first and second terminals 328 and 330 in a similar fashion to first phase 304, as illustrated in FIG. 4. Terminal box 336 and pole switching box 338 couple three adjacent stator windings 302 to third phase first and second terminals 332 and 334 in a similar fashion. Moreover, the above coupling configuration may be repeated for all stator windings 302 in stator winding assembly 300. As such, in the exemplary embodiment, terminal box 336 and pole switching box 338 couple one third of stator windings 302 to first phase 304, one third of stator windings 302 to second phase 306, and one third of stator windings 302 to third phase 308.

Figure 5:
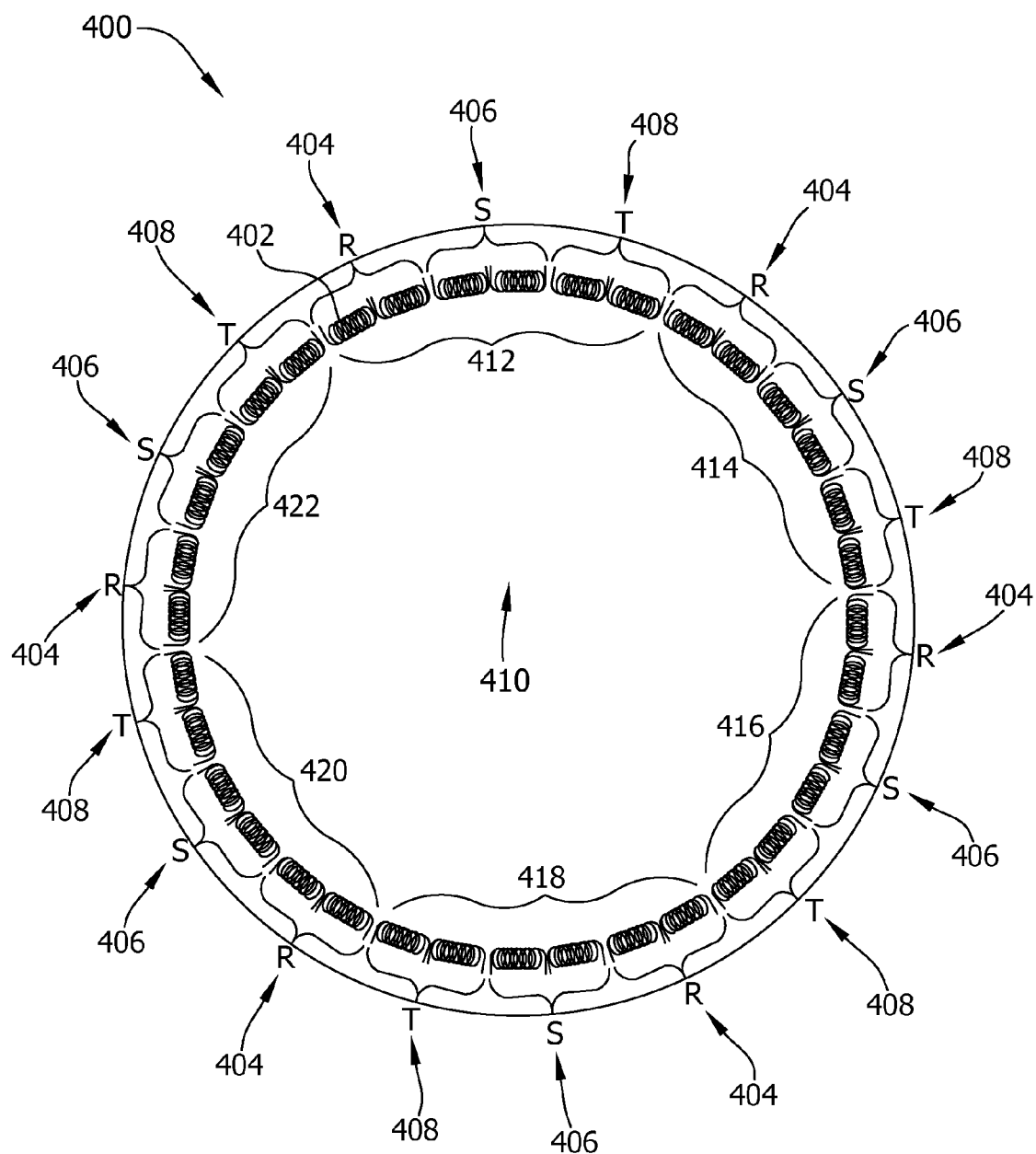
FIG. 5 is a schematic view of an alternative configuration of a stator winding assembly that may be used with the electrical and control system shown in FIG. 2.

FIG. 5 is a schematic view of an alternative configuration of a stator winding assembly 400 that may be used with electrical and control system 200 (shown in FIG. 2). Although FIG. 5 shows stator winding assembly 400 having 36 stator windings 402 that are arranged in a 6 pole configuration, in the exemplary embodiment, stator winding assembly 400 includes any number of stator windings 402 arranged with any number of poles that enables electrical and control system 200 to operate as described herein. Stator windings 402 are constructed of a conductive material, such as steel, copper, or another material known in the art.

Stator winding assembly 400 is configured to magnetically couple to generator rotor 122 (shown in FIG. 2) and to form a plurality of magnetic poles 410. FIG. 5 shows a configuration of stator winding assembly 400 having six poles, including a first pole 412, a second pole 414, a third pole 416, a fourth pole 418, a fifth pole 420, and a sixth pole 422. In the exemplary embodiment, stator windings 402 are configured to be coupled to a three phase electrical bus, such as stator bus 208 (shown in FIG. 2). More specifically, stator windings 402 are configured to be coupled to a first phase 404, a second phase 406, and/or a third phase 408 of stator bus 208.

Figure 6:
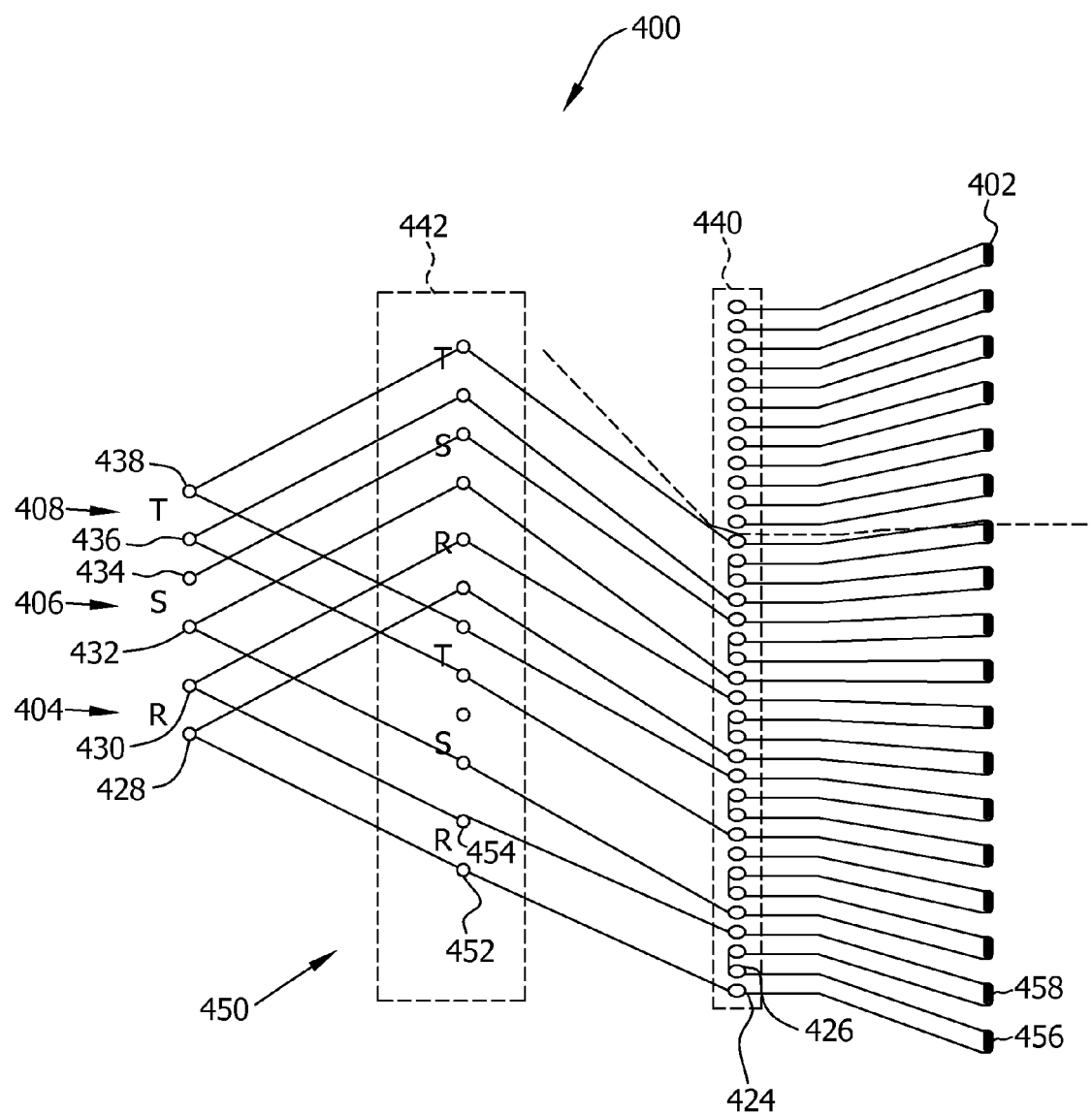
FIG. 6 is a schematic view of a portion of the alternative stator winding assembly configuration shown in FIG. 5.

FIG. 6 illustrates a schematic view of a portion of stator winding assembly 400 (shown in FIG. 5). Each stator winding 402 includes a winding first terminal 424 and a winding second terminal 426. In the exemplary embodiment, winding first terminal 424 and winding second terminal 426 of each stator winding 402 are configured to be coupled to a stator winding terminal box 440 and/or to a pole switching box 442. In the exemplary embodiment, terminal box 440 is configured to couple winding first terminal 424 and/or winding second terminal 426 together, and/or to winding first terminal 424 and/or winding second terminal 426 of one or more adjacent stator windings 402. Pole switching box 442 includes a plurality of terminals 450 that are configured to be coupled to winding first terminal 424 and/or winding second terminal 426 of one or more stator windings 402. Pole switching box terminals 450 are configured to be coupled to first phase 404, second phase 406, and/or third phase 408 of stator bus 208 (shown in FIG. 2). First phase 404 includes a first terminal 428 and a second terminal 430, second phase 406 includes a first terminal 432 and a second terminal 434, and third phase 408 includes a first terminal 436 and a second terminal 438.

In the exemplary embodiment, terminal box 440 and/or pole switching box 442 are operatively controlled by turbine controller 202 (shown in FIG. 2). Turbine controller 202 selects a number of magnetic poles 410 (shown in FIG. 5) with which to operate stator winding assembly 400, as described more fully herein. In the exemplary embodiment, terminal box 440 couples one or more adjacent stator windings 402 together via winding first terminal 424 and winding second terminal 426 of each adjacent stator winding 402. In one embodiment (shown in FIG. 6), terminal box 440 couples two stator windings 402 together via winding first terminals 424 and winding second terminals 426, as described more fully herein, to facilitate creating a 6 pole stator winding assembly 400. In an alternative embodiment, terminal box 440 couples a different number of adjacent stator windings 402 together via winding first terminals 424 and winding second terminals 426 to facilitate creating a stator winding assembly 400 having 6 poles, or a different number of poles.

In the exemplary embodiment, to form a 6 pole configuration of stator winding assembly 300, pole switching box 442 couples a pole switching box first terminal 452 to a first terminal 424 of a first stator winding 456. Terminal box 440 couples a second terminal 426 of first stator winding 456 to a first terminal 424 of a second stator winding 458. As such, terminal box 440 couples first stator winding 456 to second stator winding 458. Pole switching box 442 couples a pole switching box second terminal 454 to a second terminal 426 of second stator winding 458. Pole switching box 442 also couples pole switching box first terminal 452 to first phase first terminal 428, and pole switching box second terminal 454 to first phase second terminal 430. As such, in the exemplary embodiment, terminal box 440 and pole switching box 442 couple two stator windings 402 to first phase 404 of stator bus 208. In an alternative embodiment, terminal box 440 and pole switching box 442 couple any number of stator windings 402 to first phase 404 of stator bus 208.

In the exemplary embodiment, terminal box 440 and pole switching box 442 couple two adjacent stator windings 402 to second phase first and second terminals 432 and 434 in a similar fashion to first phase 404, as illustrated in FIG. 6. Terminal box 440 and pole switching box 442 couple two adjacent stator windings 402 to third phase first and second terminals 436 and 438 in a similar fashion. Moreover, the above coupling configuration may be repeated for all stator windings 402 in stator winding assembly 400. As such, in the exemplary embodiment, terminal box 440 and pole switching box 442 couple one third of stator windings 402 to first phase 404, one third of stator windings 402 to second phase 406, and one third of stator windings 402 to third phase 408.

In the exemplary embodiment, turbine controller 202 is configured to switch between a 4 pole configuration of stator winding assembly 300 (shown in FIG. 3) and a 6 pole configuration of stator winding assembly 400 (shown in FIG. 5). In an alternative embodiment, turbine controller 202 is configured to switch between stator winding assembly configurations having any number of magnetic poles.

Figure 7:
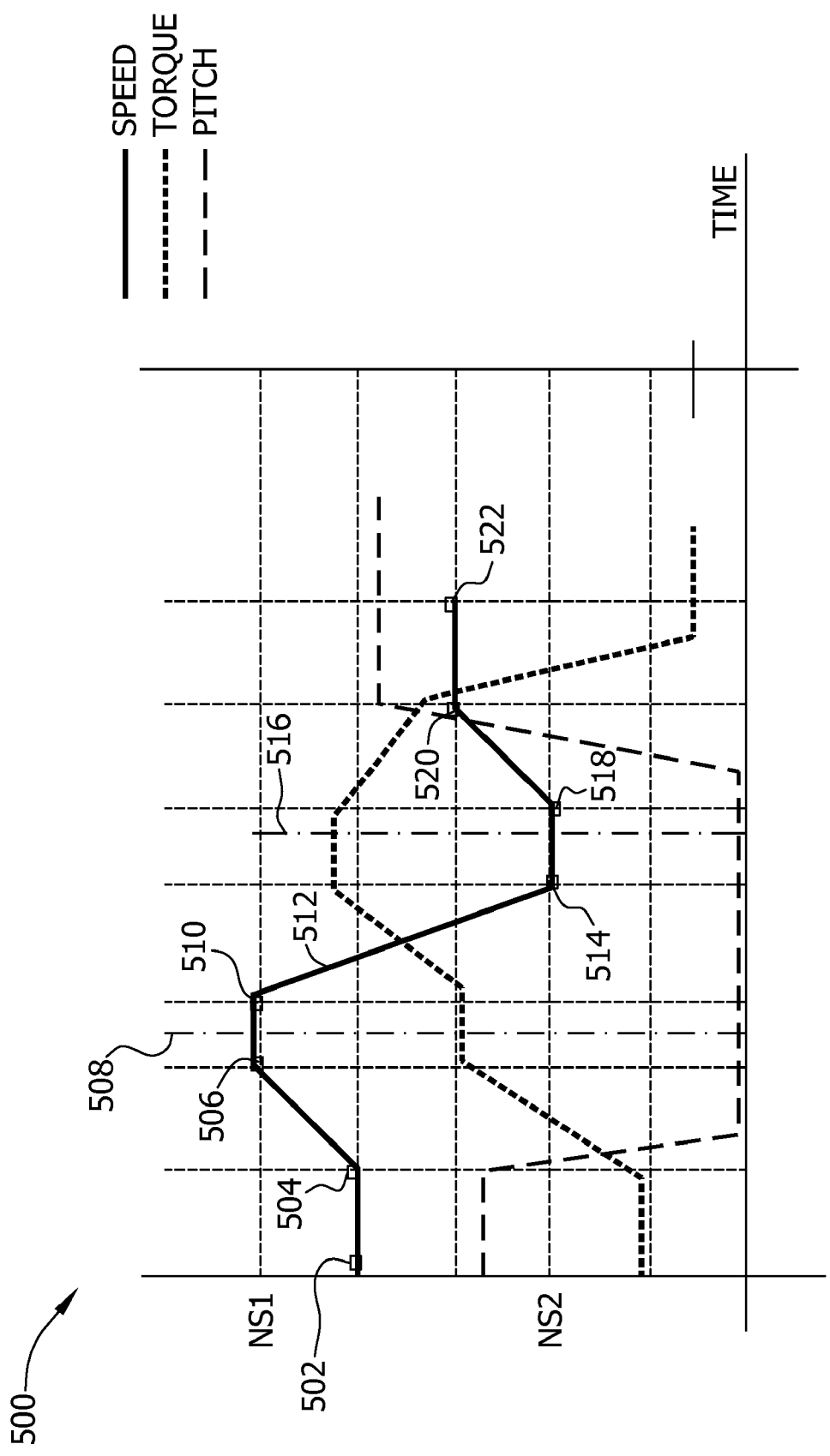
FIG. 7 is a chart illustrating an exemplary method for switching the stator winding assembly shown in FIG. 3 to a higher number of magnetic poles.

FIG. 7 is a chart illustrating an exemplary method 500 for switching generator stator 120 (shown in FIG. 2), and, more specifically, stator winding assembly 300 (shown in FIG. 3), to a higher number of magnetic poles 410 (shown in FIG. 5). In the exemplary embodiment, turbine controller 202 (shown in FIG. 2) may use method 500 to switch generator stator 120 from a 4 pole configuration of stator winding assembly 300 to a 6 pole configuration of stator winding assembly 400 (shown in FIG. 5).

In the exemplary embodiment, wind turbine 100 (shown in FIG. 1) operates at a low pole state 502. At state 504, turbine controller 202 increases a pitch angle of blades 108 (shown in FIG. 1) above a level of fine pitch control. A torque of generator 118 (shown in FIG. 2) reduces to approximately 0, which increases a rotational speed of generator rotor 122 (shown in FIG. 2) as is known in the art. At state 506, turbine controller 202 stabilizes the pitch angle of blades 108, and wind turbine 100 reaches a substantially "idle" state. At state 508, turbine controller 202 opens stator synchronizing switch 206, and generator 118 is substantially disconnected from grid bus 242 (shown in FIG. 2). At state 510, turbine controller 202 increases the pitch angle of blades 108 and the rotational speed of blades 108 decreases. At state 512, turbine controller 202 changes generator 118 to a higher number of poles. In the exemplary embodiment, turbine controller 202 changes generator 118 to a 6 pole configuration as described above in FIG. 5. In an alternative embodiment, turbine controller 202 changes generator 118 to a higher pole configuration having a different number of poles. At state 514, turbine controller 202 maintains blades 108 at a substantially uniform pitch angle and the rotation of blades 108 is maintained at a substantially constant, or synchronous, speed. At state 516, turbine controller 202 closes stator synchronizing switch 206 and generator 118 is reconnected to grid bus 242. At state 518, turbine controller 202 decreases the pitch angle of blades 108, which causes the rotational speed of blades 108 to increase. At state 520, turbine controller 202 continues decreasing the pitch angle of blades 108 to a level of fine pitch control. The rotational speed of generator 118 substantially stabilizes at a lower speed than the rotational speed of generator 118 operating at the lower number of magnetic poles 310 (shown in FIG. 3), and the torque increases from substantially 0 to a rated level. At state 522, wind turbine 100 resumes operation with generator 118 operating at the higher pole configuration.

Figure 8:
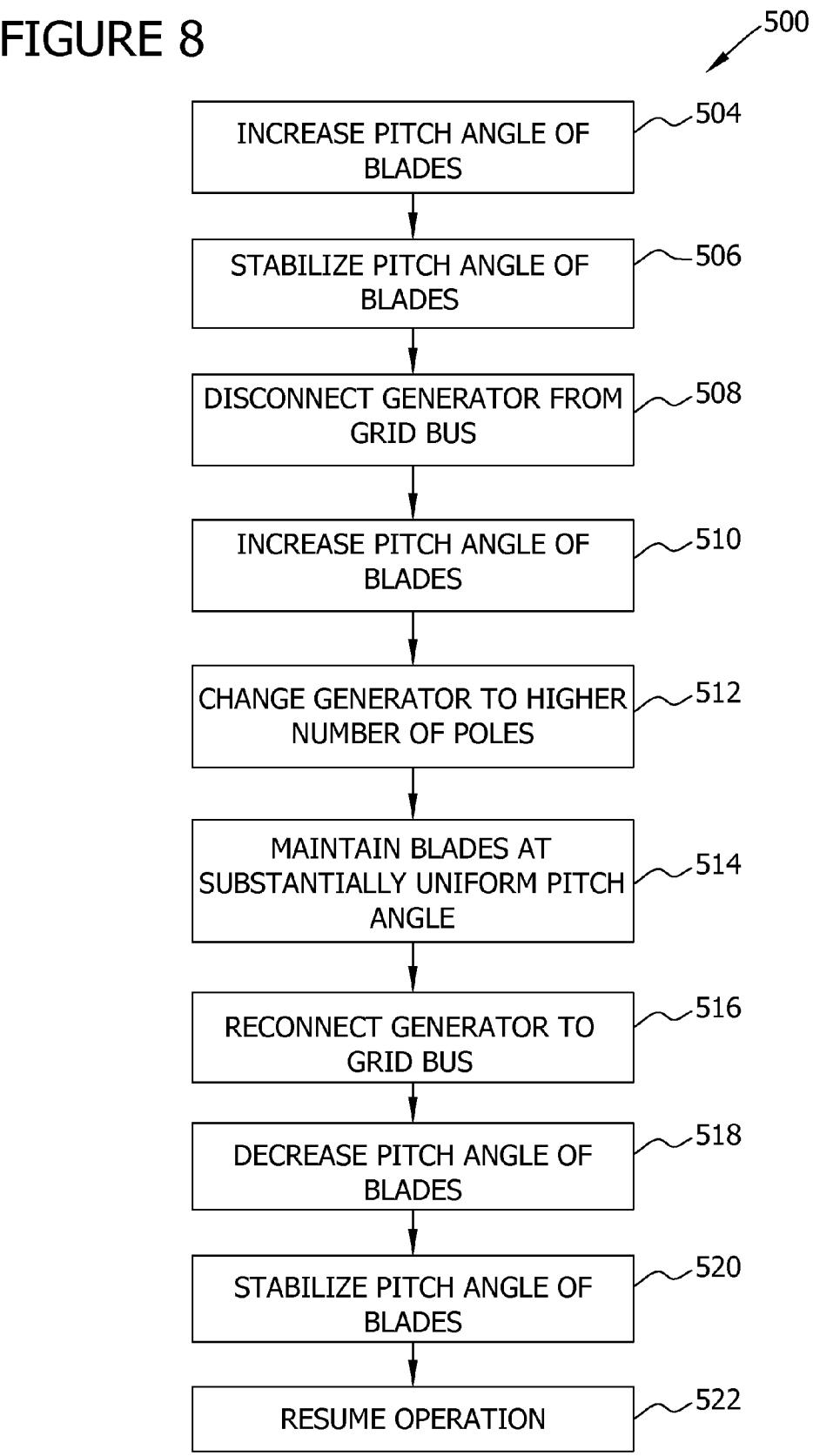
FIG. 8 is a flowchart illustrating the exemplary method for switching the stator winding assembly to a higher number of magnetic poles shown in FIG. 7.

FIG. 8 is a flowchart illustrating exemplary method 500 for switching generator stator 120 (shown in FIG. 2) and, more specifically, stator winding assembly 300 (shown in FIG. 3) to a higher number of magnetic poles 410 (shown in FIG. 5).

Referring further to FIG. 8, in the exemplary embodiment, turbine controller 202 increases 504 a pitch angle of blades 108 (shown in FIG. 1) above a level of fine pitch control. A torque of generator 118 (shown in FIG. 2) reduces to approximately 0, which increases a rotational speed of generator rotor 122 (shown in FIG. 2) as is known in the art. Turbine controller 202 stabilizes 506 the pitch angle of blades 108, and wind turbine 100 (shown in FIG. 1) reaches a substantially "idle" state. Additionally, the torque of generator 118 and the rotational speed of generator rotor 122 substantially stabilize. Turbine controller 202 disconnects 508 generator 118 from grid bus 242 (shown in FIG. 2) by opening stator synchronizing switch 206 (shown in FIG. 2). Turbine controller 202 increases 510 the pitch angle of blades 108 and the rotational speed of blades 108 decreases. Turbine controller 202 changes 512 generator 118 to a higher number of poles, such as 6 poles as described above in reference to FIG. 5. Alternatively, turbine controller 202 changes 512 generator 118 to a higher pole configuration having a different number of poles. When generator 118 changes 512 to a higher number of poles, the rotational speed of generator rotor 122 decreases. The torque of generator 118 remains substantially 0 while generator 118 remains disconnected from grid bus 242. Turbine controller 202 maintains 514 the pitch angle of blades 108 at a substantially uniform pitch angle. The rotation of blades 108 and the rotational speed of generator rotor 122 are maintained at a substantially constant, or synchronous, speed. Turbine controller 202 reconnects 516 generator 118 to grid bus 242 by closing stator synchronizing switch 206. Turbine controller 202 decreases 518 the pitch angle of blades 108, which causes the rotational speed of blades 108 to increase. The rotational speed of generator rotor 122 and the torque of generator 118 also increase. Turbine controller 202 continues decreasing the pitch angle of blades 108 and stabilizes 520 the pitch angle at a level of fine pitch control. The rotational speed of generator 118 substantially stabilizes at a lower speed than a rotational speed of generator 118 operating at a lower number of poles, and the torque of generator 118 increases from substantially 0 to a rated level. Wind turbine 100 resumes 522 operation with generator 118 operating at the higher pole configuration.

Figure 9:
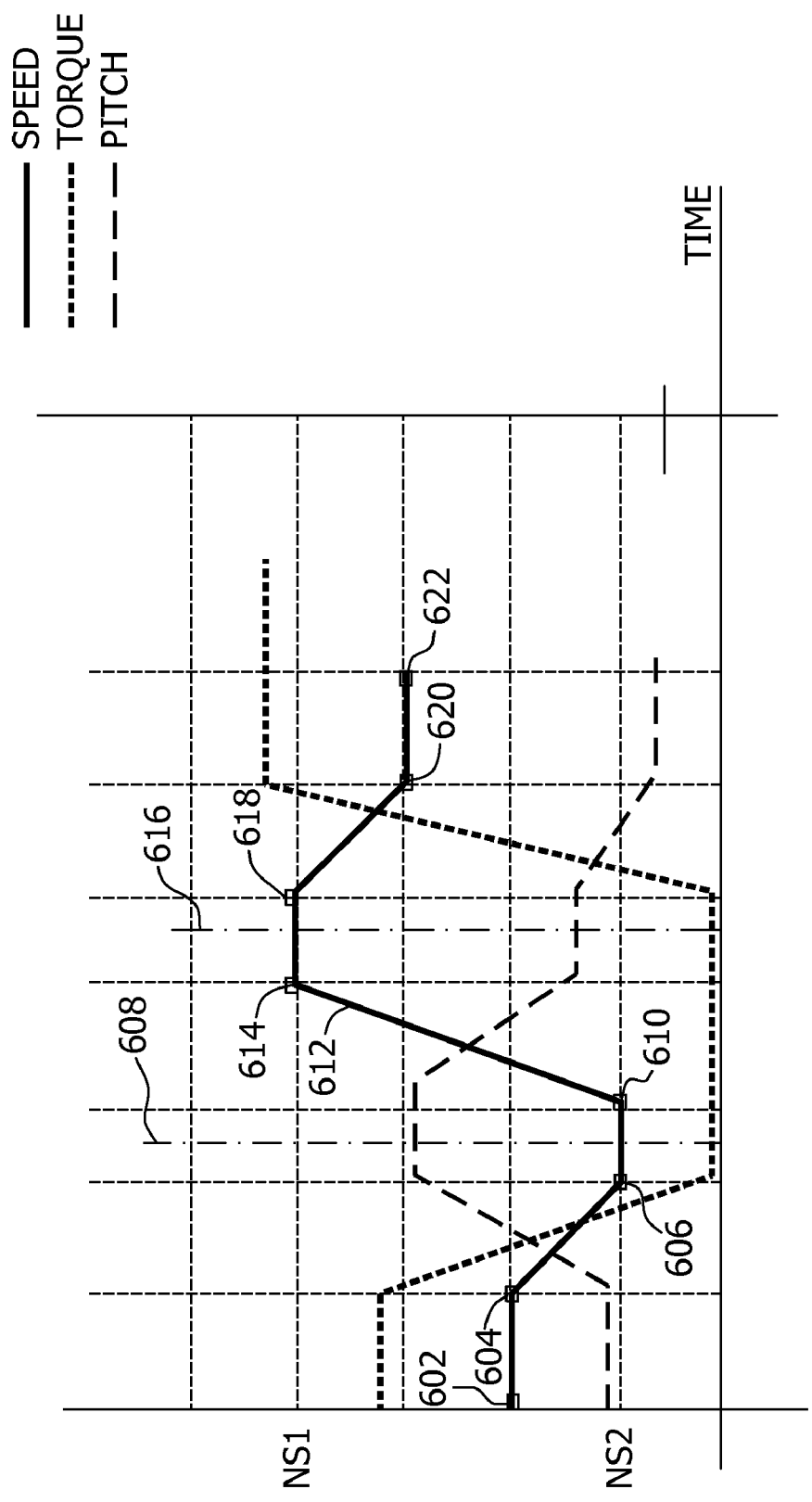
FIG. 9 is a chart illustrating an exemplary method for switching the alternative stator winding assembly shown in FIG. 5 to a lower number of magnetic poles.

FIG. 9 is a chart illustrating an exemplary method 600 for switching generator stator 120 (shown in FIG. 2), and, more specifically, stator winding assembly 400 (shown in FIG. 5), to a lower number of magnetic poles 410 (shown in FIG. 5). In the exemplary embodiment, turbine controller 202 (shown in FIG. 2) may use method 600 to switch generator stator 120 from a 6 pole configuration of stator winding assembly 400 to a 4 pole configuration of stator winding assembly 300 (shown in FIG. 3).

In the exemplary embodiment, wind turbine 100 (shown in FIG. 1) operates at a high pole state 602. At state 604, turbine controller 202 increases a pitch angle of blades 108 (shown in FIG. 1) above a level of fine pitch control. A torque of generator 118 (shown in FIG. 2) reduces to approximately 0, and a rotational speed of generator rotor 122 (shown in FIG. 2) decreases. At state 606, turbine controller 202 stabilizes the pitch angle of blades 108, and wind turbine 100 reaches a substantially "idle" state. At state 608, turbine controller 202 opens stator synchronizing switch 206, and generator 118 is substantially disconnected from grid bus 242 (shown in FIG. 2). At state 610, turbine controller 202 decreases the pitch angle of blades 108 and the rotational speed of blades 108 increases. At state 612, turbine controller 202 changes generator 118 to a lower number of magnetic poles 310 (shown in FIG. 3). In the exemplary embodiment, turbine controller 202 changes generator 118 to a 4 pole configuration as described above in FIG. 3. In an alternative embodiment, turbine controller 202 changes generator 118 to a lower pole configuration having a different number of poles. At state 614, turbine controller 202 maintains blades 108 at a substantially uniform pitch angle and the rotation of blades 108 is maintained at a substantially constant, or synchronous, speed. At state 616, turbine controller 202 closes stator synchronizing switch 206, and generator 118 is reconnected to grid bus 242. At state 618, turbine controller 202 decreases the pitch angle of blades 108. As generator 118 is reconnected to grid bus 242, the torque of generator 118 increases and the rotational speed of blades 108 reduces due to operation at a lower number of poles. At state 620, turbine controller 202 maintains the pitch angle of blades 108 at a level of fine pitch control. The rotational speed of generator 118 substantially stabilizes at a higher speed than the rotational speed of generator 118 operating at the higher number of poles, and the torque increases to a rated level. At state 622, wind turbine 100 resumes operation with generator 118 operating at the lower pole configuration.

Figure 10:
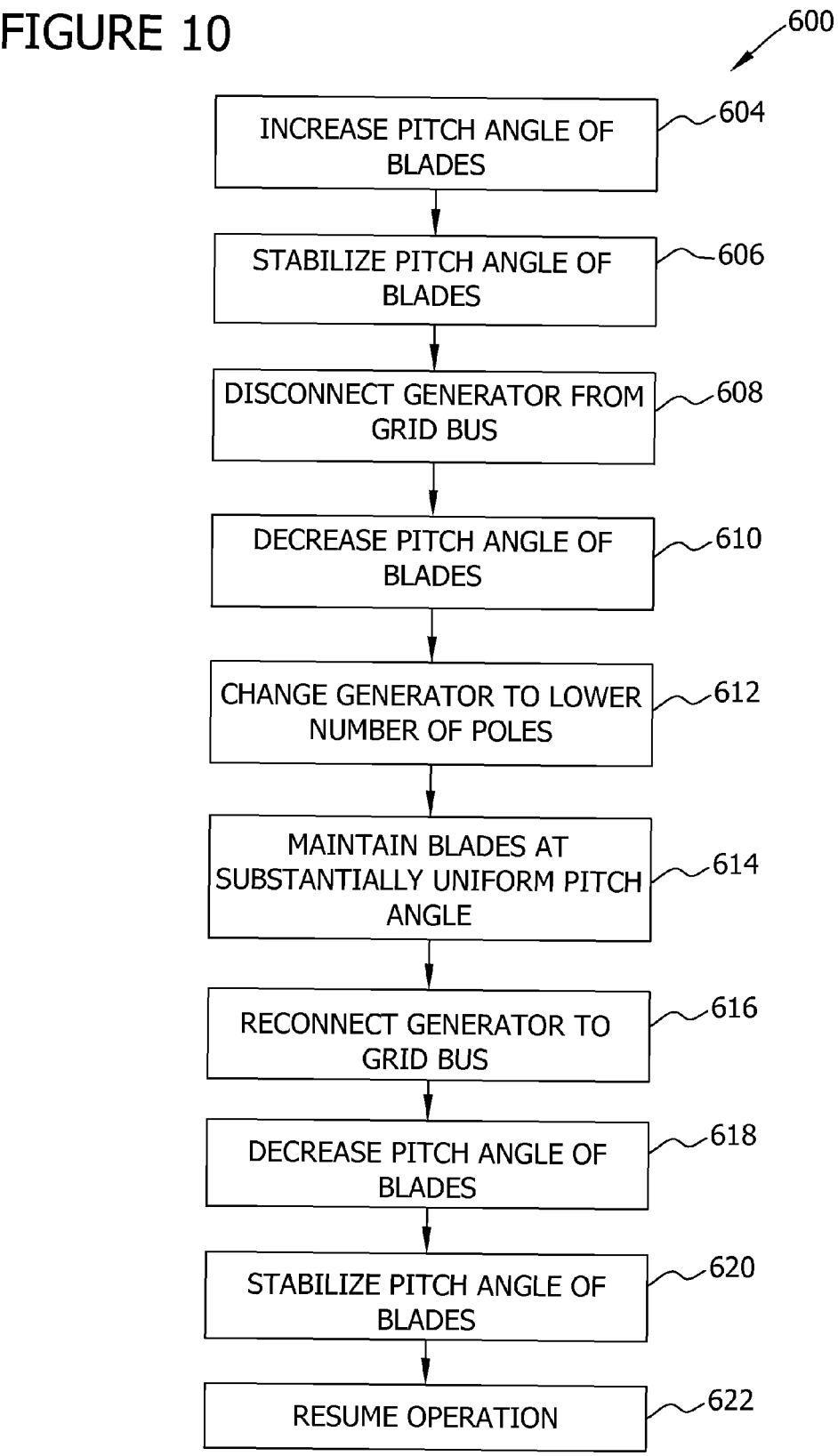
FIG. 10 is a flowchart illustrating the exemplary method for switching the stator winding assembly to a lower number of magnetic poles shown in FIG. 9.

FIG. 10 is a flowchart illustrating exemplary method 600 for switching generator stator 120 (shown in FIG. 2) and, more specifically, stator winding assembly 400 (shown in FIG. 5) to a lower number of magnetic poles 310 (shown in FIG. 3).

Referring further to FIG. 10, in the exemplary embodiment, turbine controller 202 increases 604 a pitch angle of blades 108 (shown in FIG. 1) above a level of fine pitch control. A torque of generator 118 (shown in FIG. 2) reduces to approximately 0, and a rotational speed of generator rotor 122 (shown in FIG. 2) decreases. Turbine controller 202 stabilizes 606 the pitch angle of blades 108, and wind turbine 100 reaches a substantially "idle" state. Additionally, the torque of generator 118 and the rotational speed of generator rotor 118 substantially stabilize. Turbine controller 202 disconnects 608 generator 118 from grid bus 242 (shown in FIG. 2) by opening stator synchronizing switch 206 (shown in FIG. 2). Turbine controller 202 decreases 610 the pitch angle of blades 108 and the rotational speed of blades 108 increases. Turbine controller 202 changes 612 generator 118 to a lower number of poles, such as 4 poles as described above in reference to FIG. 3. Alternatively, turbine controller 202 changes 612 generator 118 to a lower pole configuration having a different number of poles. When generator 118 changes 612 to a lower number of poles, the rotational speed of generator rotor 122 increases. The torque of generator 118 remains substantially 0 while generator 118 remains disconnected from grid bus 242. Turbine controller 202 maintains 614 the pitch angle of blades 108 at a substantially uniform pitch angle. The rotation of blades 108 and the rotational speed of generator rotor 122 are maintained at a substantially constant, or synchronous, speed. Turbine controller 202 reconnects 616 generator 118 to grid bus 242 by closing stator synchronizing switch 206. Turbine controller 202 decreases 618 the pitch angle of blades 108. The torque of generator 118 increases and the rotational speed of blades 108 and the rotational speed of generator rotor 122 reduce due to the operation of generator 118 at a lower number of poles. Turbine controller 202 substantially stabilizes 620 the pitch angle of blades 108 at a level of fine pitch control. The rotational speed of generator 118 substantially stabilizes at a higher speed than a rotational speed of generator 118 operating at a higher number of poles, and the torque of generator 118 increases to a rated level. Wind turbine 100 resumes 622 operation with generator 118 operating at the lower pole configuration.

As illustrated in FIGS. 7, 8, 9, and 10, use of methods 500 and 600 facilitates providing different rotational speeds at which generator 118 switches between a lower number of poles and a higher number of poles. More specifically, generator 118 operates at a first rotational speed, or range of speeds, before switching from a lower number of poles to a higher number of poles, and operates at a second rotational speed, or range of speeds, that is lower than the first rotational speed after switching to the higher number of poles. Conversely, generator 118 operates at the second rotational speed, or range of speeds, before switching from a higher number of poles to a lower number of poles, and operates at the first rotational speed, or range of speeds, after switching to the lower number of poles. It should be recognized that a rotational speed of blades 108 is proportional to a rotational speed of generator 118 due to an operation of low-speed shaft 112, gearbox 114, and high-speed shaft 116.

Wind turbine 100 may be coupled to a wind farm management system (not shown) via wind turbine controller 202 to facilitate coordinating an operation of wind turbine 100 with other wind turbines. Specifically, the wind farm management system may control a number of wind turbine generators within a wind farm (not shown) that may switch to a different number of poles at the same time. As such, the wind farm management system may control a number of wind turbine generators that are disconnected from the electrical grid during pole switching operations, thus reducing power generation fluctuations within the electrical grid.

Operation of wind turbine 100 using methods 500 and 600, and generator 118, including stator winding assemblies 300 and 400, facilitates providing more efficient wind turbine 100 operation. As known in the art, use of a double-fed induction generator enables a wind turbine to operate approximately at 30% above and below a rated wind speed. Simulation data indicates that use of methods 500 and 600, with generator 118, including stator winding assemblies 300 and 400, facilitates operating wind turbine 100 between approximately 50% below and 30% above rated wind speed. Moreover, use of stator winding assemblies 300 and 400 with generator 118 facilitates reducing an amount of current that flows through power conversion assembly 210 (shown in FIG. 2). As such, a size of power conversion assembly 210 may be reduced to provide further cost savings and efficiency. Moreover, simulation data indicates that using methods 500 and 600, with generator 118, facilitates increasing an annual energy production (AEP) of wind turbine 100 by between approximately 1.5% and approximately 2.2%.

The above-described embodiments facilitate providing an efficient and cost-effective generator having multiple pole configurations. The generator and methods described herein facilitate providing an increased range of operational wind speeds for a wind turbine. As such, the generator and methods described herein facilitate enabling a wind turbine to capture more power from wind, and to operate more efficiently at a wider range of wind speeds. Moreover, the generator and methods described herein facilitate reducing a size and/or cost of a power conversion system that may be used with the generator.

Exemplary embodiments of a wind turbine generator and methods of operating a wind turbine generator are described above in detail. The methods and generator are not limited to the specific embodiments described herein, but rather, components of the generator and/or steps of the methods may be utilized independently and separately from other components and/or steps described herein. For example, the generator and methods may also be used in combination with other wind turbine power systems and methods, and are not limited to practice with only the power system as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A generator for use in a wind turbine, said generator comprising:
   a rotor comprising a plurality of rotor windings, said rotor configured to be electrically coupled to a wind turbine electrical distribution system;
   a stator comprising a plurality of stator windings, said stator configured to be magnetically coupled to said rotor, and electrically coupled to the wind turbine electrical distribution system; and,
   a terminal box coupled to said stator, said terminal box configured to switch said stator between a first number of magnetic poles and a second number of magnetic poles.

2. A generator in accordance with claim 1, wherein said rotor is coupled to the wind turbine electrical distribution system by at least one slip ring.

3. A generator in accordance with claim 2, wherein said at least one slip ring is coupled to a variable resistor to modify an amount of slip of said generator.

4. A generator in accordance with claim 2, wherein said at least one slip ring is coupled to a power converter.

5. A generator in accordance with claim 1, wherein said terminal box is configured to couple together at least one pair of adjacent stator windings of said plurality of stator windings.

6. A generator in accordance with claim 1, wherein said generator comprises a pole switching box configured to couple at least one stator winding of said plurality of stator windings to the wind turbine electrical distribution system.

7. A generator in accordance with claim 1, wherein said stator is configured to couple together at least two stator windings of said plurality of stator windings, said stator is further configured to switch between the first number of magnetic poles and the second number of magnetic poles by changing a number of said plurality of stator windings that are coupled together.

8. A generator in accordance with claim 1, wherein said generator is coupled to a controller, the controller configured to:
disconnect said generator from the wind turbine electrical distribution system;
switch said generator from the first number of magnetic poles to the second number of magnetic poles; and,
reconnect said generator to the wind turbine electrical distribution system.

9. A wind turbine comprising:
a wind turbine electrical distribution system; and,
a generator comprising:
a rotor comprising a plurality of rotor windings, said rotor configured to be electrically coupled to said wind turbine electrical distribution system;
a stator comprising a plurality of stator windings, said stator configured to be magnetically coupled to said rotor, and electrically coupled to said wind turbine electrical distribution system; and,
a terminal box coupled to said stator, said terminal box configured to switch said stator between a first number of magnetic poles and a second number of magnetic poles.

10. A wind turbine in accordance with claim 9, wherein said rotor is coupled to said wind turbine electrical distribution system by at least one slip ring.

11. A wind turbine in accordance with claim 10, wherein said at least one slip ring is coupled to a variable resistor to modify an amount of slip of said generator.

12. A wind turbine in accordance with claim 10, wherein said at least one slip ring is coupled to a power converter.

13. A wind turbine in accordance with claim 9, wherein said terminal box is configured to couple together at least one pair of adjacent stator windings of said plurality of stator windings.

14. A wind turbine in accordance with claim 9, wherein said generator comprises a pole switching box configured to couple at least one stator winding of said plurality of stator windings to said wind turbine electrical distribution system.

15. A wind turbine in accordance with claim 9, wherein said stator is configured to couple together at least two stator windings of said plurality of stator windings, said stator is further configured to switch between the first number of magnetic poles and the second number of magnetic poles by changing a number of said plurality of stator windings that are coupled together.

16. A wind turbine in accordance with claim 9, wherein said generator is coupled to a controller, said controller configured to:
disconnect said generator from said wind turbine electrical distribution system;
switch said generator from the first number of magnetic poles to the second number of magnetic poles; and,
reconnect said generator to said wind turbine electrical distribution system.

17. A method for generating power in a wind turbine, said method comprising:
providing a wind turbine electrical distribution system within the wind turbine;
coupling a generator to the wind turbine electrical distribution system, the generator including a rotor having a plurality of rotor windings and a stator having a plurality of stator windings;
magnetically coupling the stator to the rotor;
coupling a terminal box to the stator; and,
configuring the terminal box to switch the stator between a first number of magnetic poles operating during a first range of speeds and a second number of magnetic poles operating during a second range of speeds.

18. A method in accordance with claim 17, wherein said method further comprises:
disconnecting the generator from the wind turbine electrical distribution system;
switching the generator from the first number of magnetic poles to the second number of magnetic poles; and,
reconnecting the generator to the wind turbine electrical distribution system.

19. A method in accordance with claim 17, wherein said method further comprises coupling the terminal box to at least one pair of adjacent stator windings of the plurality of stator windings.

20. A method in accordance with claim 17, wherein said method further comprises coupling a pole switching box between at least one stator winding of the plurality of stator windings and the wind turbine electrical distribution system.

* * * * *